United States Patent Office 3,421,277
Patented Jan. 14, 1969

3,421,277
PRE-GROUTED FLEXIBLE TILE PANEL
Robert W. Frischmuth, Shaker Heights, Ohio, assignor, by mesne assignments, to SCM Corporation, New York, N.Y. a corporation of New York
No Drawing. Filed June 3, 1965, Ser. No. 461,160
U.S. Cl. 52—390    12 Claims
Int. Cl. E04f *13/08;* B32b *3/14;* C09j *5/00*

ABSTRACT OF THE DISCLOSURE

A curable plastic composition for grouting tile and the like in substantially one application, comprising in admixture: a fluent water-continuous phase of an emulsion of thermoplastic particles; and a coarse solids phase of thermoplastic beads, such plastic composition desirably retaining its volume after cure. The invention also relates to a method of using such composition to prepare pre-grouted flexible tile panels and to the panels so prepared.

---

Heretofore the preparation of pre-grouted flexible tile panels has been proposed. Such flexibility is a desirable feature for conforming the panels to normal minor substrate surface irregularities. However, preparation of such panels has often proven to be tedious and costly. Hence the advantages of my invention over the prior art include efficiency and economy, particularly because my plastic composition is neither undesirably sticky nor solid and thus is easily applied in a single grouting step to tile joints without special delicacy and/or the use of special apparatus. Any excess plastic composition present after grouting can be quickly removed by merely striking across the face of the panel with suitable striking means. The composition cures readily to a finished, grouted joint having excellent durability, e.g., withstands repeated washings without noticeably wearing and neither becomes hard nor brittle upon ageing. The finished joint further displays excellent freeze-thaw stability, good water resistance, and good heat (e.g., infrared) and ultraviolet light stability. The plastic composition retains desirably volume in the tile joints after curing and produces a "natural" appearing panel, i.e., one having an organic grout appearance simulating tiles laid singly and grouted individually in conventional manner.

My plastic composition comprises a mixture having about 15–55 weight percent fluent water-continuous phase and about 45–85 weight percent coarse solids phase, the fluent phase being an aqueous emulsion of thermoplastic particles and 0 to about 4 parts of plasticizer, basis weight of the thermoplastic particles, the concentration of the thermoplastic particles and plasticizer in the fluent phase being about 30 to 85 weight percent, basis the weight of the fluent phase and the coarse solids phase being 5–100 weight percent thermoplastic beads and 0–95 weight percent filler on a basis of the coarse solids phase.

The flexible pre-grouted tile panels of my invention comprise a plurality of tiles connected on edge one to another by the residue retained upon curing the hereinabove-described grouting composition.

Grouted tile panels of my invention are made by placing a plurality of tiles in planar relationship with joints between adjacent tiles, depositing my grouting composition into the joints, then curing the deposited composition. The grouting composition is preferably cured in place by first evaporating off a major portion of the volatile components at a temperature not substantially in excess of about 150° F. and subsequently heating the resulting material contained in the tile joints at a temperature above the fusion point of the thermoplastic beads present for a time sufficient to substantially fuse these beads.

My plastic composition can be used for pre-grouting tile panels, or for patching, grouting, or caulking substrate applied materials, such as virtually any kind of tile including glass, flagstone, and plastics in addition to the more conventional ceramic tiles. Flexible pre-grouted panels are readily prepared, for example, from either the absorptive or non-absorptive types of ceramic tiles, including both the vitreous and porcelain varieties of the non-absorptive type. The plastic composition can be made to adhere to both fused ceramic tiles such as porcelain tiles, i.e., those which are the same composition throughout, as well as to the ceramic tiles which have a supporting bisque structure with simply a surface glaze. As used herein the term "tile panel" is meant to include any section having two or more tiles connected together at edges for application to a substrate. The panel can be in flat, bent, or coiled strip form, long or short, wide or narrow, but for convenience generally is 1 ft. x 2 ft. or 1 ft. x 1 ft. for easy handling and substantially flat for application to planar surfaces.

The fluent phase of my plastic composition is a water-continuous, stable aqueous emulsion of thermoplastic particles, which particles are also referred to herein as "resin particles." Additionally, the emulsion can contain plasticizer and minor amounts of volatile organic solvent, as discussed hereinbelow. Thus, suitable aqueous emulsions which I can use for my fluent phase include aqueous emulsified plastisols and organosols. Additional suitable emulsions, usually containing smaller proportions of plasticizer than the aqueous emulsified plastisols and organosols, are often referred to in the art as "colloidal solutions" or "latex dispersions." Generally these emulsions have average particle size of the resin particles between about 0.01 to about 10 microns with the latex dispersions being formed with average particle size of resin particles most often between about 0.2 and about 6 microns, whereas colloidal solutions usually have finer average particle size. Where some plasticizer is present in the emulsion, it can act to swell the resin particles to dimensions beyond their water-dispersed size given herein. Additionally, when a volatile organic solvent is present in the emulsion, such solvent can act to form true solutions of a portion of the resin particles.

The concentration of thermoplastic particles and plasticizer in the fluent phase should be between about 30 to 85 weight percent on a basis of the fluent phase. Using less than about 30 weight percent of thermoplastic particles and plasticizer involves the handling and evaporation of much water or water plus volatile organic solvent and is thus uneconomical, while using greater than about 85 weight percent of plasticizer plus thermoplastic particles can produce a phase inversion of the water-continuous phase, leading to a sticky or gelled material which is difficult to work with and presents messy clean-up situations, such as in cleaning the tile faces after pre-grouting.

Furthermore, I use from 0 to about 4 parts of plasticizer, on a weight basis of the thermoplastic particles. Using greater than about 4 parts can produce a cured, resilient substance which has undesirable abrasion resistance. On the other hand, I use "internally plasticized" emulsions, which often do not contain any plasticizer. Preferably because they work well in preparing pre-grouted flexible tile panels and are economical, I use emulsions having about 35–50 weight percent resin particle concentration in the fluent phase, which emulsions are stabilized, for preferred abrasion resistance of the cured product and for good pre-grouted panel flexibility, with about 0.1 to about 0.4 part of plasticizer, basis weight of the thermoplastic particles.

The thermoplastic particles in the fluent phase and the thermoplastic beads in the coarse solids phase can be the same or different compositions, and especially with regard to the beads can be mixtures of homopolymeric thermoplastic materials. However, for economy and outstanding adhesion of plastic composition to tile, I prefer to use beads which have as their major portion polyvinyl acetate homopolymer and which beads are dispersed in an aqueous emulsion containing thermoplastic particles which likewise are a major portion of polyvinyl acetate homopolymer.

Suitable materials which I can use for both the thermoplastic particles of the fluent phase and the thermoplastic beads of the coarse solids phase, in addition to the preferred polyvinyl acetate homopolymer, include polyvinyl-pyrrolidone, polyvinyl butyral, vinyl chloride/vinylidene chloride copolymers, butadiene/acrylonitrile copolymers, vinyl butyral/phenolic copolymers, polyvinyl pyridine, polyvinyl propionate, vinyl acetate/vinyl chloride copolymers (e.g., up to about 95% vinyl chloride content), vinyl acetate copolymerized with higher vinyl monomers, e.g., vinyl stearate and vinyl butyral, and in addition vinyl monomers (including vinylidene chloride, vinylpyrrolidone and particularly vinyl acetate for its adhesiveness) polymerized alone or in combination with $\alpha$, $\beta$, and $\beta,\gamma$ ethylenically unsaturatetd mono and dicarboxylic acids and alkyl esters and half esters thereof, and more particularly, dibutyl maleate-vinyl acetate and dibutyl fumarate-vinyl acetate copolymers, and polyvinyl acetate terpolymers, including those formed from styrene and acrylate esters. Some of these copolymeric emulsions, e.g., the vinyl acetate-lower alkyl acrylate emulsions, can form "internally plasticized" emulsions through careful proportioning of comonomers.

Plasticizers which I can and have used include dibutyl phthalate, tributyl phosphate, chlorinated diphenyl compounds, di(2-ethylhexyl) phthalate, tricresyl phosphate, diisodecyl phthalate and the like. Plasticizers for the resin particles are well known in the art and thus are not described herein in detail.

Aqueous emulsions as described hereinabove conventionally contain additional ingredients such as heat and light stabilizers and emulsifying agent and the like. Such additional materials, which are well known in the art, include methylcellulose and polyvinyl alcohol emulsifying agents, materials to reduce water sensitivity of the thermoplastic ingredients upon evaporating of volatile components from the emulsion, e.g., glyoxol, diacetin, succinic acid, and such agents as exhibit this ability to reduce water sensitivity plus possess some solvation power on the thermoplastic ingredients, e.g., benzene, methanol, acetone, carbon tetrachloride, methylchloroform, alkoxyalkanols, and polyoxyalkylene glycols of monoalkyl ethers, and viscosity depressants such as cyclohexylamine. The heat and light stabilizers (retard darkening of the resin) include the barium, cadmium, and tin salts of carboxylic acids, e.g., cadmium stearate. Additionally some volatile organic liquids, e.g., toluene and xylol, will be present in aqueous emulsified organosols.

The thermoplastic beads in the coarse solids phase should constitute from about 5–100 weight percent of such solids phase, basis weight of that phase. Using less than about 5 weight percent beads, i.e., greater than 95 weight percent filler, can impair the durability of tile joints, such as encountered in repeated washings of substrate applied panels, by not providing sufficient beads to fuse during the curing of the grout. Up to 100 weight percent beads can be used where maximum weathering resistance is not a requirement of the cured plastic composition, e.g., for most indoor uses of tiles. Preferably, for economy, best water resistance, freeze-thaw resistance, and stability against ultraviolet light degradation I use about 10–70 weight percent beads.

The beads should have particle size such that substantially all, e.g., 95%, pass through a No. 20 mesh, U.S. Standard Sieve otherwise referred to herein as just "20 mesh." Also substantially all beads should be retained on a 325 mesh sieve. Beads having particle size greater than about 20 mesh will, upon fusion, tend to leave unattractive pock marks, which can also produce weak joints when used in grouting tiles, i.e., joints of decreased tile-to-grout adhesiveness. Beads having particle size below about 325 mesh can be difficult to handle, i.e., are light (dusty), bulky, and sticky and can increase the grout viscosity to form a messy paste. Because of the economy afforded by their commercial availability and since they work well in my grouting composition, I prefer to use thermoplastic beads having particle size between about 30–200 mesh.

The coarse solids phase of the plastic composition, for reasons discussed hereinabove, can contain 0–95 weight percent filler, basis weight of such coarse solids phase. The filler particles should have size such that substantially all particles will pass 10 mesh; otherwise the plastic composition which is visible on the finished panel, e.g., used as grout in tile joints (also referred to herein as "grout lines"), will be noticeably coarse, e.g., such joints will feel "sandy" to the touch. Additionally, to avoid the handling of powders which can present dust problems, I usually select fillers having particle size such that substantially all particles are retained at 325 mesh or coarser, although some fillers, including fibrous magnesium silicate and Portland cement are often produced such that up to 100% of the particles pass 325 mesh and these materials are serviceable in such form. For efficiency, and to insure against graininess in tile joints, I prefer to use a filler having average particle size between about 30–200 mesh. Suitable fillers which I can and have used include sand, whiting, barytes, wood flour, ground walnut shells and the like. In addition to the above fillers, coarse pigment solids, i.e., inorganic materials such as titanium dioxide, carbon black, chrome green, iron oxide reds and the like, can be included as a minor portion of such filler. To avoid graininess in grout lines such pigments should likewise have particle size below about 10 mesh.

The plastic composition should be about 15–55 weight percent fluent phase, and thus about 45–85 weight percent coarse solids phase. Less than about 45 weight percent coarse solids phase can produce a grouting composition which is undesirably fluent, e.g., can flow from the tile joints during grouting, shrink on curing to an unattractive appearing grout, and can impair durability. On the other hand, using more than about 85 weight percent coarse solids phase can produce a solid plastic composition which is difficult to readily mix into a desirably homogeneous workable mixture. Preferably, for most easy mixing and for cured grout which is free from cracking with panel flexing, I use about 65–70 weight percent coarse solids phase.

Typical compounding of the plastic composition comprises simply stirring a commercial latex emulsion of thermoplastic particles, or aqueous emulsified plastisol, or the like, at room temperature (77° F.) while gradually adding to the emulsion the thermoplastic beads and filler. If desired, prior to the addition of beads and filler to the emulsion, I can add to the emulsion any pigments, additional water for adjusting fluidity of the plastic composition, plasticizer (additions of which can increase ultimate panel flexibility when grouting same with my plastic composition), and/or agents such as enhance the water resistance of the grout after curing. When a desirably homogeneous composition has been achieved, it can be simply poured in the tile joints and the like, or where a more viscous composition is prepared, it can also be applied in grout lines by injection.

When applying the plastic composition for pre-grouted panels, the tiles can be simply placed by hand on a substantially flat surface and held there, but they are preferably positioned and held by flexible backing members in composites such as have been shown in U.S. Patents 2,265,614 and 2,741,909. Right after grouting, the grouted panel face is advantageously struck with a tool such as a rubber blade or edge of a rubber block, to depress the grout in the grout lines and remove virtually all excess grout, should any be present after grouting, before evaporation of substantial water from the grout hinders ready removal by producing a less fluent plastic composition. Next the grouted panel face is advantageously wiped with a suitable wiping means such as a rag, sponge, squeezee or the like to remove trace amounts of excess grout and simultaneously smooth down the grout in the grout lines. The wiping means is preferably moistened to partially lubricate the wiping means and thus assist the grout smoothing, and, additionally, is preferably moistened with water since other liquids, e.g., benzene, although operable, are neither as economical nor as efficient. Since curing of the grout does not appreciably change the grout volume, the resulting panel has slightly depressed grout lines, i.e., pressed below the tile front faces as generally results when tiles are laid on a substrate and grouted together individually in conventional manual operation.

When the plastic composition has been applied, such as grout in tile joints, and any excess preferably removed by striking, I can initiate curing by evaporating volatile grout components at room to moderate temperature, and in any case at a temperature not substantially in excess of about 150° F., to avoid unattractive blistering of the grout by rapid evaporation. Mostly water is evaporated, but minor amounts of other materials, e.g., fugitive plasticizer, emulsion stabilizer, organic solvents, trace amounts of unpolymerized material, and the like can evaporate as "volatile ingredients" of the plastic composition. In the air drying at room temperature, a period of about 24–72 hours will provide sufficient evaporation so that subsequent heating for bead fusion will not blister the grout surface. Alternatively, the grout can be oven dried with temperatures from about 125 to about 140° F. usually removing in about 2–4 hours sufficient volatile liquid to avoid blistering during bead fusion.

After this evaporation, including typically, removal of about 7/10 of the total water, the panel is heated by preferably placing in an oven, for efficiency and economy, which oven should be set at a temperature sufficient to provide for fusion of the thermoplastic beads present in the plastic composition, i.e., at a temperature generally at least about 10° F. above the softening point of the thermoplastic beads, but not substantially in excess of about 130° F. above the softening point. Heating at a temperature not substantially in excess of about 10° F. above the bead softening point produces only gradual fusing and is therefore uneconomical and inefficient. On the other hand, heating substantially in excess of about 130° F. above the softening point can ruin the organic structure of the grout, e.g., gradually char the beads during fusion. Preferably, for efficient fusion without heat degradation of organic grout ingredients, I heat at a temperature about 40–80° F. above such bead softening temperature. For the preferred polyvinyl acetate homopolymer beads, which usually have softening points within the range from about 200 to 325° F., my preferred temperature range is thus between about 240–405° F.

I have found that when fusing within my preferred temperature range of about 240–405° F., heating for a period of about 10–45 minutes is sufficient to develop a plastic composition of firmly fused beads, i.e., one which is free not only from crack development, but also free from separation of the composition from tiles upon panel flexing. The duration of the heating should be adjusted upwardly when lower temperatures are used, and shortened when applying higher temperatures, as will be well recognized. Within my preferred temperature range, heating for less than about 10 minutes can lead to insufficient bead fusion, and thus a plastic composition weakly adhering to the tiles, while heating for substantially more than about 45 minutes is uneconomical and can jeopardize the organic structure of the plastic composition, i.e., cause charring. For enhanced freedom from composition cracking on panel flexure without incurring charring, I prefer to heat for about 20–40 minutes, within my preferred temperature range.

To facilitate the use of grouted and cured tile panels I apply an adhesive composition to the back faces of the panels, which back faces comprise, for example, a flexible backing member and/or tile back faces. My plastic composition can form at least a portion of the adhesive composition. Desirably a plastic sheet is placed over the adhesive for protection before use. When the panel is used, this sheet is merely stripped away to expose the adhesive and the panel then pressed upon the substrate. The substrate itself can be coated with adhesive before the panel is applied, or, as in the case where the panel has a concentrated or viscous adhesive, activator fluid for the adhesive can be brushed on to the substrate to assist the panel-substrate bond. In operation, after curing and cooling a grouted panel, I have often troweled on to the panel back a pressure sensitive adhesive of the butadiene-styrene-resin type, optionally modified with rosin and/or petroleum resin type, optionally modified with rosin and/or petroleum resins, and covered the adhesive with a sheet of polyethylene. Prior to using the panel, additional resin thinned with aliphatic hydrocarbons is then brushed on the substrate, the polyethylene sheet is stripped away, and the panel manually forced on the precoated substrate. After a short time, such panels are tenaciously adhering. As an alternative to this pre-applied panel adhesive, I can use a conventional thin-set mortar, organic adhesive, or the like and trowel same on the substrate, or panel, just prior to pressing the panel on the substrate.

During grouting of tile joints, exterior panel edges can be rimmed with grouting composition before curing. Advantageously sufficient grouting composition is used along the panel edges so that adjacent panels on a substrate have a grouted tile joint therebetween when such rimmed panel edges are forcibly pressed together during the application of the panels to a substrate. This avoids any residual grouting during the paneling of a substrate. When unrimmed panels are applied to a substrate, sufficient space can be left between adjacent panels to provide tile joints which are then filled with grout and struck, as with a rubber blade, to provide paneling of finished appearance. Preferably, for color match, I use my grouting composition for this finishing, since simple air drying of the composition provides good durability even after repeated washings. When preformed grout rims are used on panels they can provide forced, incompletely bonded seals which will leak water between panels and lead to bacteria infiltration and growth and premature grout degradation. Thus, for best sealing, I prefer to use unrimmed panels and to leave tile joints between adjacent panels on a substrate, then grout such joints with my plastic composition to form a finished panelled surface.

The following example shows a way in which my invention has been practiced, but should not be construed as limiting the invention. In the example all parts by weight, all mesh sizes are U.S. Standard Sieve, and all temperatures are in degrees Fahrenheit, unless otherwise expressly specified.

Example

The fluent phase of the plastic composition was based on 3000 parts of a commercial polyvinyl acetate emulsion in water containing 50 weight percent solids and having polyvinyl acetate particles of about 2.5 micron average particle size; the emulsion had a weight per gallon of 9 pounds and a viscosity of 2500 cps. at 77° as measured with a number 3 spindle at 20 r.p.m. on a Brookfield viscosimeter. To these 3000 parts of emulsion there was added with continuous mixing 350 parts water, 95 parts rutile titanium dioxide pigment, 100 parts glyoxal and 350 parts of mixed benzoic acid esters of lower alkylene glycols having average molecular weight of 328.3, weight per gallon at 77° of 9.6 pounds and an ester content of 98%, minimum.

A plastic composition, A, was prepared by adding to 110 parts of the above-formed fluent mixture, with stirring: 160 parts of washed, white silica sand having particle size such that 100% of the particles passed 40 mesh; and, 80 parts of polyvinyl acetate beads having softening point of 220° and average particle size such that 99.8% of the particles passed 40 mesh.

Similar plastic compositions, B, C, and D, were prepared by adding to 110 parts of the above fluent mixture the following above-described coarse solids parts: B, 120 parts beads, 120 parts sand; C, 160 parts beads, 80 parts sand; and D, 240 parts beads, 0 parts sand. All plastic compositions, A through D, were preparations which were readily stirred into homogeneous mixtures.

Four square panels containing 121 individual nonabsorptive, vitreous, ceramic mosaic tiles, each panel having 11 tiles to the side and each tile having a 1″ x 1″ face, were selected for grouting with the plastic composition. The panels were pre-assembled with reinforcing and spacing members which were affixed corner-wise to adjacent tile only on the back faces of such tiles, as has been shown in U.S. Patent No. 2,741,909. The grout lines for all panels were $\frac{3}{32}$ in. wide.

These four panels were placed on a smooth tray in horizontally flat positions with the tile front faces up, and the first panel then grouted entirely with composition A, the second panel grouted entirely with composition B, and so forth, all grouting being performed in similar manner by pouring a pool of plastic composition onto the center of each pasel and then uniformly distributing same to the tile joints by repeatedly stroking a rubber float across the panel face, which float was a wooden-handled tool having a block of resilient rubber affixed thereto. All panels were then manually struck across the tile faces with a rubber blade and then finished with a water-soaked cellulose sponge. The striking quickly and simply removed virtually all excess plastic composition from the grout lines, and such composition as had been accidentally spilled upon tile front faces, and depressed the composition in the grout lines. Sponging then removed trace amounts of excess composition and also smoothed down the depressed composition in the grout lines.

Panels were then tagged A through D corresponding to the respective compositions A–D and such panels were air dried for 48 hours at 77°, removing 80 weight percent of the water from the grout, and then taken on the tray and placed for 30 minutes in an oven heated at 300° to fuse the polyvinyl acetate beads in the tile joints.

Upon removal from the oven and cooling, all panels were visually inspected and all grout lines appeared smooth with no visible pock marks or other surface imperfections. Likewise, all panel grout lines felt smooth to the touch. The panels were then placed on a substantially flat table surface and one pair of opposite panel edges were manually pushed towards each other, causing the panel to "hump," i.e., causing arcing of the pair of panel edges which were not being pushed towards one another, which arcing was viewed by looking parallel to the table surface. The humping was increased until the center portion of the panel was one inch above the table surface, and then the pressed sides were released and the panel allowed to return to a substantially flat conformation.

After this flexing had been repeated an equal number of times for all panels, these panels were visually inspected in both a flexed position and a substantially flat position, which inspection showed no development of grout imperfection, e.g., grout rupture or separation of individual tiles from the grout. Additionally, all grout lines felt smooth to the touch in both flexed and flat position.

A weatherometer test exposed specimens A through D initially to a combination of ultraviolet light with infrared source heat at 160°, then water spray propelled by air pressure, and finally cooling. The four specimens were mounted side-by-side on a plywood panel to simulate a typical tile installation and then the panel was clamped to the weatherometer for simultaneous and uniform exposure of all panels.

The air pressure propelling the water spray corresponded to an air velocity of 150 m.p.h. The following 24-hour test cycle was employed: 2 hours of U.V. light plus infrared heat; 6 hours of water spray with attendant air pressure (at room temperature, i.e., 77°); 12 hours of cooling at −5°; and 4 hours at room temperature (77°).

The above cycle was repeated for 15 days after which all panels were removed from the machine and visually inspected. With panels held at arms length, observation showed all grout lines to be smooth and have natural, organic grout appearance; but upon closer inspection some slight bubbling was detected in a few grout lines of both the 0 parts sand panel, D, and the 80 parts sand panel, C, and such compositions were thus recommended for indoor use. A and B panels showed no signs of grout failure, e.g., grout cracking or bubbling and likewise had excellent appearance.

I claim:
1. A curable plastic composition adapted substantially to retain its volume after cure and therefore adapted for grouting tile and the like in substantially one application, said composition comprising a mixture of:
  (a) about 15 to 55 weight percent fluent water-continuous phase of an aqueous emulsion of a thermoplastic resinous polymer and 0 to 4 weight parts of a plasticizer per weight part of said polymer, the polymer and plasticizer together constituting about 30 to 85 percent by weight of said water-continuous phase; and
  (b) about 45 to 85 percent of a coarse solids phase contributing to said volume retention of the curable plastic composition comprising 0 to 95 weight percent filler and 5 to 100 weight percent of solid beads selected from the group consisting of thermoplastic resinous homopolymers and copolymers, said filler having a particle size between about 10 to 400 mesh, and said beads having a particle size between about 20 to 235 mesh and effective to retain their individual bead-shape up to at least about 150° F.

2. The plastic composition of claim 1 wherein said thermoplastic polymer of said emulsion and said thermoplastic beads contain vinyl acetate units.

3. The composition of claim 2 wherein said polymer and said beads are polyvinyl acetate homopolymer, and said aqueous emulsion is about 35 to 60 weight percent solids content, basis the weight of said aqueous emulsion, and 0 to about 0.4 part of plasticizer, basis the weight of said thermoplastic particles.

4. The composition of claim 2 wherein said polymer and said beads are composed of vinyl acetate copolymerized with vinyl chloride.

5. The composition of claim 2 wherein said polymer and said beads are composed of vinyl acetate copolymerized with a compound selected from the group consisting essentially of $\alpha$, $\beta$ and $\beta,\gamma$ ethylenically unsaturated mono and dicarboxylic acids and alkyl esters and half esters thereof.

6. The composition of claim 1 wherein said aqueous emulsion contains volatile organic solvent, said solvent being dispersed therein in a proportion insufficient to provide phase inversion of said water-continuous fluent phase.

7. The plastic composition of claim 1 wherein said coarse solids phase consists essentially of 10–70 weight percent thermoplastic beads and 30–90 weight percent filler, basis the coarse solids phase.

8. The composition of claim 7 wherein the major portion of said beads has particle size between about 30–200 mesh and the major portion of said filler has particle size between about 30–200 mesh.

9. A tile panel adapted to be mounted upon a backing member, said panel comprising a plurality of tiles connected on edge one to another by the residue retained upon curing a grout mixture having about 15 to 55 weight percent fluent water-continuous phase of an aqueous emulsion of a thermoplastic resinous polymer and 0 to 4 weight parts of a plasticizer per weight part of said polymer, the polymer and plasticizer together constituting about 30 to 85 percent by weight of said water-continuous phase; and about 45 to 85 percent of a coarse solids phase contributing to said volume retention of the curable plastic composition comprising 0 to 95 weight percent filler and 5 to 100 weight percent of solid beads selected from the group consisting of thermoplastic resinous homopolymers and copolymers, said filler having a particle size between about 10 to 400 mesh, and said beads having a particle size between about 20 to 235 mesh and effective to retain their individual bead-shape up to at least 150° F.

10. The method of making a grouted tile panel comprising:
(a) placing a plurality of tiles in planar relationship with joints between adjacent tiles;
(b) depositing into said joints a mixture having about 15 to 55 weight percent fluent water-continuous phase of an aqueous emulsion of a thermoplastic resinous polymer and 0 to 4 weight parts of a plasticizer per weight part of said polymer, the polymer and plasticizer together constituting about 30 to 85 percent by weight of said water continuous phase; and about 45 to 85 percent of a coarse solids phase contributing to said volume retention of the curable plastic composition comprising 0 to 95 weight percent filler and 5 to 100 weight percent of solid beads selected from the group consisting of thermoplastic resinous homopolymers and copolymers, said filler having a particle size between about 10 to 400 mesh, and said beads having a particle size between about 20 to 235 mesh and effective to retain their individual bead-shape up to at least about 150° F.; and
(c) curing the deposited mixture.

11. The method of claim 10 wherein the quantity of said mixture deposited in said joints is in excess of that required to substantially fill the joints, and such excess is removed by striking prior to the curing step.

12. The method of claim 10 wherein said mixture is cured in the tile joints by first evaporating off, at a temperature not substantially in excess of about 150° F., a major portion of volatile components of said mixture, and subsequently heating the material resulting in said joints at a temperature above the fusion point of said thermoplastic beads for a time sufficient to substantially fuse said beads.

References Cited

UNITED STATES PATENTS

| | | | |
|---|---|---|---|
| 2,204,324 | 6/1940 | Sohngen et al. | 260—17.4 |
| 2,782,173 | 2/1957 | Bristol et al. | 260—29.6 |
| 2,887,867 | 5/1959 | Burchenal et al. | 161—39 X |
| 3,036,977 | 5/1962 | Kock et al. | 156—332 X |
| 3,088,588 | 5/1963 | Feichter et al. | 52—309 X |
| 3,185,748 | 5/1965 | MacDonald et al. | 52—309 X |
| 3,239,981 | 3/1966 | Fitzgerald et al. | 161—38 X |
| 3,348,988 | 10/1967 | Wagner et al. | 156—71 |

ROBERT F. BURNETT, *Primary Examiner.*

P. THOMAS, *Assistant Examiner.*

U.S. Cl. X.R.

52—415; 161—38; 156—304, 305, 333; 260—29.6